US010615719B2

(12) United States Patent
Miyajima

(10) Patent No.: US 10,615,719 B2
(45) Date of Patent: Apr. 7, 2020

(54) VIBRATION MOTOR CONTROLLER, LENS APPARATUS INCLUDING THE SAME, AND IMAGE PICKUP APPARATUS INCLUDING THE SAME

(71) Applicant: CANON KABUSHIKI KAISHA, Tokyo (JP)

(72) Inventor: Shunsuke Miyajima, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 516 days.

(21) Appl. No.: 15/016,339

(22) Filed: Feb. 5, 2016

(65) Prior Publication Data
US 2016/0241167 A1 Aug. 18, 2016

(30) Foreign Application Priority Data

Feb. 12, 2015 (JP) ................................. 2015-025011

(51) Int. Cl.
*G02B 7/02* (2006.01)
*H01L 41/04* (2006.01)
(Continued)

(52) U.S. Cl.
CPC ............... *H02N 2/06* (2013.01); *G02B 7/04* (2013.01); *H02N 2/142* (2013.01)

(58) Field of Classification Search
CPC . G02B 7/08; G02B 7/04; G02B 7/023; G02B 7/02; G02B 7/021; G02B 15/173; G02B 7/102; H02N 2/14; H01L 41/042
(Continued)

(56) References Cited

U.S. PATENT DOCUMENTS 5,841,215 A 11/1998 Takeishi
5,889,350 A 3/1999 Yamamoto
(Continued)

FOREIGN PATENT DOCUMENTS

CN 1592070 A 3/2005
CN 102189074 A 9/2011
(Continued)

OTHER PUBLICATIONS

Office Action issued in Chinese Appln. No. 201610084836.3 dated Jan. 5, 2018. English Translation provided.
(Continued)

*Primary Examiner* — Dawayne Pinkney
(74) *Attorney, Agent, or Firm* — Rossi, Kimms & McDowell LLP

(57) ABSTRACT

A vibration motor controller configured to cause a vibrating member in which a vibration is excited based on two frequency signals having a phase difference to move relatively to a contact member, the vibration motor controller including: a memory configured to store a speed characteristic of the vibrating member with respect to a frequency of the two frequency signals; a controller configured to control a speed of the vibrating member by changing the frequency and/or a phase difference of the two frequency signals; a detector configured to detect the speed; and a changing unit configured to acquire change amount and change direction of the speed characteristic based on comparison between the speed detected by the detector and the speed characteristic stored in the memory, and change an activation frequency being a start point of control conducted by the controller based on the change amount and the change direction.

14 Claims, 8 Drawing Sheets

(51) Int. Cl.
*H02N 2/06* (2006.01)
*H02N 2/14* (2006.01)
*G02B 7/04* (2006.01)

(58) Field of Classification Search
USPC ................ 359/811–830, 676, 694, 696–698; 318/116; 310/316, 317, 319
See application file for complete search history.

(56) References Cited

U.S. PATENT DOCUMENTS

| | | |
|---|---|---|
| 6,987,345 B2 | 1/2006 | Yamamoto |
| 7,423,361 B2 | 9/2008 | Tanaka |
| 8,558,488 B2 | 10/2013 | Murakami |
| 9,048,760 B2 | 6/2015 | Kataoka et al. |
| 2002/0008439 A1 | 1/2002 | Senda et al. |
| 2011/0068718 A1* | 3/2011 | Murakami ............. H02N 2/142 318/116 |
| 2013/0249445 A1 | 9/2013 | Sumioka |

FOREIGN PATENT DOCUMENTS

| | | |
|---|---|---|
| JP | 59178984 A | 10/1984 |
| JP | H07156493 A | 6/1995 |
| JP | H11265213 A | 9/1999 |
| JP | 2008054418 A | 3/2008 |
| JP | 2011067035 A | 3/2011 |

OTHER PUBLICATIONS

Extended European Search Report issued in European Application No. EP16000296.0 dated Jul. 7, 2016.

Office Action issued in European Appln. No. 16000296.0 dated Nov. 29, 2017.

Office Action issued in Chinese Appln. No. 201610084836.3 dated Sep. 4, 2018. English translation provided.

Office Action issued in European Appln. No. 16000296.0 dated Jun. 7, 2018.

Office Action issued in Japanese Appln. No. 2015-025011 dated Oct. 23, 2018. English translation provided.

* cited by examiner

VIBRATION MOTOR CONTROLLER, LENS APPARATUS INCLUDING THE SAME, AND IMAGE PICKUP APPARATUS INCLUDING THE SAME

BACKGROUND OF THE INVENTION

Field of the Invention

The present invention relates to a vibration motor controller configured to control a driving speed of a vibration motor, a lens apparatus including the same, and an image pickup apparatus including the same.

Description of the Related Art

A vibration motor includes: a vibrating member formed of a metal elastic body to which an electrical-mechanical energy conversion element (piezoelectric element or electrostrictive element) is joined or the like; and a contact member brought into pressure contact with the vibrating member. When a plurality of frequency signals having a phase difference therebetween are applied to a piezoelectric element, a vibration is excited in the vibrating member, and the contact member moves relatively to the vibrating member, to thereby generate a driving force. The vibration motor has a characteristic that a speed increases by increasing the phase difference between the applied frequency signals (hereinafter referred to as "phase difference") and that a drive direction is reversed with a given phase difference. Further, the vibration motor has a characteristic that the speed increases by decreasing a frequency of the applied frequency signal (hereinafter referred to as "frequency"), reaches a peak at a given frequency, and steeply drops by further decreasing the frequency. In particular, the frequency at which the speed reaches the peak is referred to as "resonant frequency". In a general control method for a vibration motor, a higher frequency side than the resonant frequency is used while use of a frequency domain in which the speed steeply drops is avoided. However, the vibration motor has the resonant frequency changed due to influence of an environmental change (in temperature or humidity), and hence a user may use the vibration motor without noticing that a curve of speed characteristics has changed due to the environmental change and may use a lower frequency side than the resonant frequency against his/her will. Further, when the resonant frequency changes, even in a case where the lower frequency side than the resonant frequency is not used, desired speed characteristics may not be obtained by a controller, to thereby degrade controllability. This requires such control as to detect a change in the resonant frequency and handle the change. Hitherto, there are proposed various methods of detecting a change in the resonant frequency due to the environmental change or the like and handling the change. In Japanese Patent Application Laid-Open No. 2011-67035, there is described a method of detecting a current temperature by using a temperature sensor and applying a correction value to the frequency or an amplitude of the frequency signal based on the detected temperature. Further, in Japanese Patent Application Laid-Open No. S59-178984, there is described a method of searching for the resonant frequency by measuring the speed while sequentially changing the frequency.

However, the technology described in Japanese Patent Application Laid-Open No. 2011-67035 is required to newly include the temperature sensor in a configuration thereof, which complicates the configuration. In addition, with the method of applying the correction value to the frequency or the amplitude, the correction value is a representative value, and hence individual differences of vibration motors cannot be handled. Further, with the technology described in Japanese Patent Application Laid-Open No. S59-178984, the resonant frequency can be detected for each individual through use of a detection operation for sequentially changing the frequency without including the temperature sensor in the configuration. However, with the method of detecting the resonant frequency conducted by the detection operation different from a normal operation, the user is entrusted with a timing of detection, and may fail to notice an abnormal change in time. That is, the detection operation may be conducted when the user notices the abnormal change after performance greatly deteriorates.

SUMMARY OF THE INVENTION

The present invention provides a vibration motor controller configured to suppress degradation of controllability due to an environmental change by detecting a change in a resonant frequency during a normal operation and correcting the frequency to be used for control without complicating the controller.

According to one embodiment of the present invention, there is provided a vibration motor controller, configured to control a vibration motor configured to cause a vibrating member in which a vibration is excited based on two frequency signals having a phase difference to move relatively to a contact member brought into contact with the vibrating member, the vibration motor controller including:

a memory configured to store a speed characteristic of the vibrating member with respect to a frequency of the two frequency signals;

a controller configured to control a speed of the vibrating member by changing at least one of the frequency and a phase difference of the two frequency signals;

a detector configured to detect the speed; and a changing unit configured to acquire a change amount and a change direction of the speed characteristic based on a comparison between the speed detected by the detector and the speed characteristic stored in the memory, and change an activation frequency being a start point of control conducted by the controller based on the change amount and the change direction.

According to the one embodiment of the present invention, it is possible to suppress degradation of controllability due to an environmental change by detecting a change in a resonant frequency during a normal operation and correcting the frequency to be used for control without complicating the controller.

Further features of the present invention will become apparent from the following description of exemplary embodiments with reference to the attached drawings.

DESCRIPTION OF THE EMBODIMENTS

Exemplary embodiments of the present invention are hereinafter described in detail with reference to the attached drawings.

First Embodiment

Figure 1:
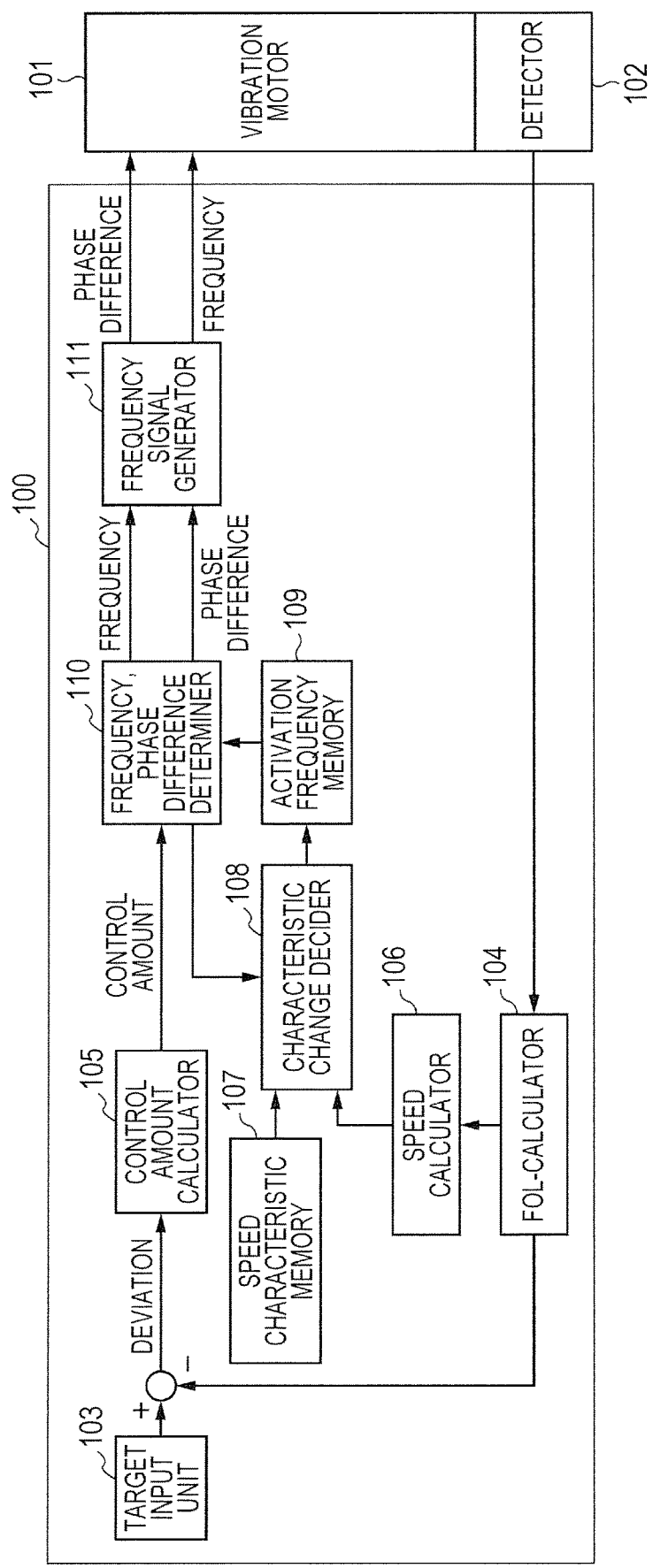
FIG. 1 is a block diagram of a vibration motor controller according to a first embodiment of the present invention.

A configuration of a vibration motor controller according to a first embodiment of the present invention is described with reference to FIG. 1. The present invention relates to a vibration motor controller configured to control a driving speed of a vibration motor configured to cause a contact member brought into contact with a vibrating member in which a vibration is excited based on two frequency signals having a phase difference to move relatively to the vibrating member. In the following description, to facilitate an understanding of the present invention, only main components of the present invention are described with reference to FIG. 1, and components that are not involved in features of the present invention are omitted.

A controller 100 conducts drive control for a vibration motor 101, and is formed of, for example, a CPU or a PC.

A detector 102 is, for example, an encoder, and detects information necessary for a FoI-calculator 104 described later to conduct an arithmetic operation for current information (position and speed) on the vibration motor 101.

A target input unit 103 inputs a driving target of the vibration motor. For example, the target input unit 103 may be formed of an input unit such as a switch or a graphical user interface (GUI), or may calculate the driving target through an arithmetic operation. Further, the driving target is set as a position or a speed.

The FoI-calculator (detector) 104 calculates current information on the vibration motor 101 based on an output from the detector 102. The current information includes the position and the speed, and is information in the same dimension as that handled by the target input unit 103.

A control amount calculator 105 is implemented by, for example, PID control, and calculates a control amount based on a difference (deviation) between the driving target and the current information on the vibration motor 101. The PID control is a known technology, and hence a description thereof is omitted.

A speed calculator 106 calculates a speed from positional information when an output from the FoI-calculator 104 is positional information on the vibration motor 101. As a calculation method therefor, for example, the speed may be calculated from a difference between a current position and a previous position at least one time before. Further, when the output from the FoI-calculator 104 is the speed of the vibration motor 101, the speed calculator 106 may be omitted.

A speed characteristic memory (memory) 107 stores speed characteristics with respect to the frequency and the phase difference of the vibration motor 101. The speed characteristics may be, for example, a table or a math expression.

A characteristic change decider (changing unit) 108 determines a change in the speed characteristics by comparing a speed derived as a result of driving the vibration motor 101 with a frequency signal of the frequency and the phase difference determined by a frequency/phase-difference determiner 110 described later with the speed characteristics stored in the speed characteristic memory 107. The change to be determined includes a change direction and a change amount of a resonant frequency. A determination method therefor is described later in detail.

An activation frequency memory (memory or changing unit) 109 stores a frequency (hereinafter referred to as "activation frequency") serving as a start point of the drive control, and changes (corrects) the activation frequency based on a determination result from the characteristic change decider 108. In general, the activation frequency is the highest frequency among frequencies to be used, and when the driving speed of the vibration motor is controlled to become fast, control to reduce the frequency from the activation frequency is conducted.

The frequency/phase-difference determiner 110 determines the frequency and the phase difference of the frequency signal to be applied to the vibration motor 101 based on the control amount and the activation frequency.

A frequency signal generator 111 generates the frequency signal to be applied to the vibration motor 101 based on the frequency and the phase difference that have been determined.

Next, a specific determination method for the change in speed characteristics conducted by the characteristic change decider 108 and a correction method for the activation frequency stored in the activation frequency memory 109 are described.

Figure 2A:
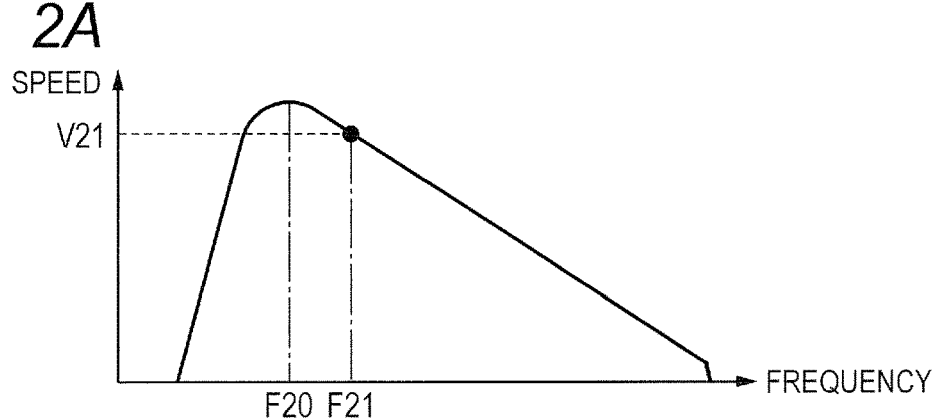
FIG. 2A is a graph for showing reference speed characteristics (1-point measurement) of the vibration motor controller according to the first embodiment.
Figure 2B:
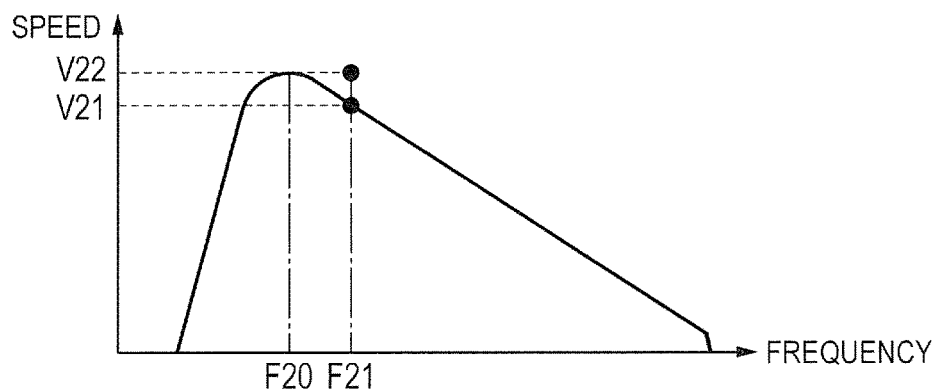
FIG. 2B is a graph for showing a comparison between a driving speed derived by the vibration motor controller according to the first embodiment and a speed obtained in the speed characteristics.

In FIG. 2A, the speed characteristics of the vibration motor 101 stored in the speed characteristic memory 107 are shown. The horizontal axis indicates the frequency, the vertical axis indicates the speed, and the curve indicates the speed with respect to the frequency with a given phase difference. In this embodiment, it is assumed that the phase difference is constantly fixed. A frequency F20 is a resonant frequency. Now, it is assumed that a speed V21 is obtained at a frequency F21 set as a higher frequency than the resonant frequency F20. In FIG. 2B, the driving speed calculated when the driving is conducted at the frequency F21 higher than the resonant frequency F20 under a given environment is shown. A speed V22 is obtained as a result of conducting the driving at the frequency F21. The speed V21 is expected to be obtained at the frequency F21 based on the speed characteristics stored in the speed characteristic memory 107, but the speed V22 is obtained in FIG. 2B. That is, it is understood that the actual speed characteristics have changed. Therefore, it can be inferred that environmental conditions have changed.

Figure 2C:
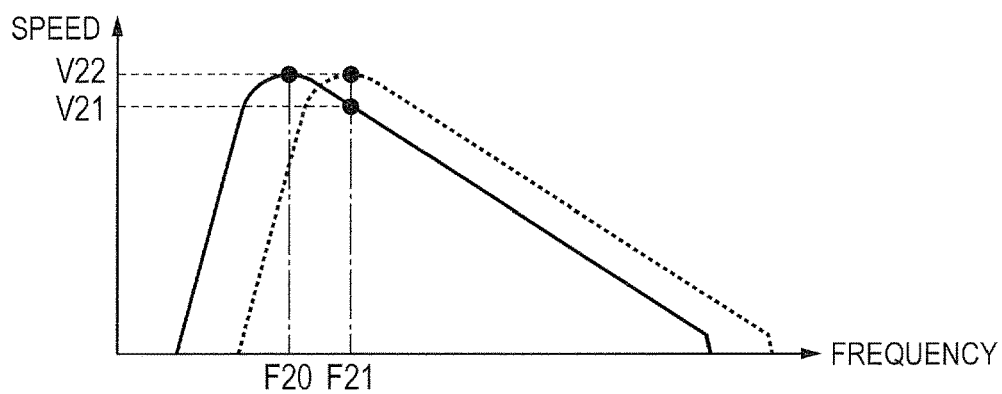
FIG. 2C is a graph for showing a change in the speed characteristics of the vibration motor controller according to the first embodiment.
Figure 2D:
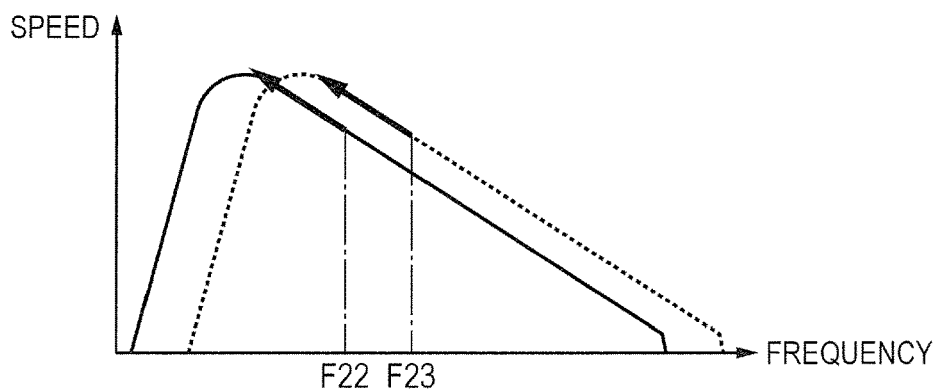
FIG. 2D is a graph for showing the change in the speed characteristics of the vibration motor controller according to the first embodiment and controllability thereof.

Next, in FIG. 2C, a calculation method for a change direction and a change amount of the speed characteristics is shown. The curve of the solid line indicates the speed characteristics stored in the speed characteristic memory 107, and the curve of the broken line indicates the speed characteristics changed under an environment shown in FIG. 2B. The speed V22 is obtained as a result of conducting the driving at the frequency F21, and hence the frequency at which the speed V22 is obtained is found from the curve of the solid line stored in the speed characteristic memory 107. As a result, it is understood that the speed V22 is obtained at the frequency F20, namely, the resonant frequency. Therefore, it is understood that the speed characteristics have changed toward a high frequency side because the speed characteristics indicated at the frequency F20 in the curve of the solid line are obtained at the frequency F21. In addition, the change amount is a difference between the frequency F21 and the frequency F20. Therefore, it is understood that, under the environment shown in FIG. 2B, the speed characteristics have changed toward the high frequency side by the difference between the frequency F21 and the frequency F20. It is inferred from the above description that, under the environment shown in FIG. 2B, the speed characteristics of the vibration motor 101 have changed toward the curve of the broken line shown in FIG. 2C. Therefore, the activation frequency stored in the activation frequency memory 109 is corrected toward the high frequency side by the difference between the frequency F21 and the frequency F20. In FIG. 2D, the same speed characteristics as those of FIG. 2C are shown. When the speed characteristics of the vibration motor 101 exhibit the speed characteristics indicated by the solid line stored in the speed characteristic memory 107, a frequency F22 is set as the activation frequency, and the driving speed is controlled as indicated by the arrow of the solid line. Under the environment shown in FIG. 2B, the vibration motor 101 exhibits the speed characteristics indicated by the broken line in FIGS. 2C and 2D, and hence the activation frequency is set as a frequency F23, and the control is conducted as indicated by the arrow of the broken line. Therefore, the arrow of the solid line and the arrow of the broken line indicate the activation frequency at which the same speed characteristics are obtained and the same inclination, and hence the same controllability can be obtained even before and after an environmental change.

With the method described above, the same controllability can be obtained even before and after the environmental change by detecting the change direction and the change amount of the speed characteristics of the vibration motor 101 due to the environmental change and correcting the activation frequency. Further, a new component such as a temperature sensor is not added, and hence the configuration can be realized without being made complicated.

Figure 3A:
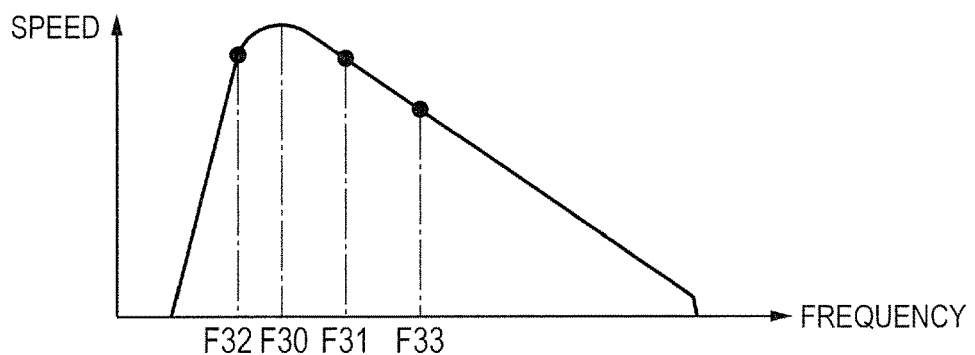
FIG. 3A is a graph for showing reference speed characteristics (3-point measurement) of the vibration motor controller according to the first embodiment.

In this embodiment, the speed is calculated for only one point, namely, the frequency F21 to determine the change direction and the change amount of the speed characteristics, but it is more preferred that the speed be calculated for a plurality of frequencies to determine the change direction and the change amount of the speed characteristics. In FIG. 3A, the same speed characteristics as those of FIG. 2A are shown. Attention is focused on frequencies F31, F32, and F33. The frequency F31 is a frequency on a higher frequency side than a resonant frequency F30, and the frequency F32 is a frequency on a lower frequency side than the resonant frequency F30. In the speed characteristics, the frequency F31 and the frequency F32 are frequencies at which the same speed is obtained. The frequency F33 is a frequency higher than the frequencies F31 and F32, and in the speed characteristics, is a frequency at which the speed slower than the speed obtained at the frequencies F31 and F32 is obtained.

Figure 3B:
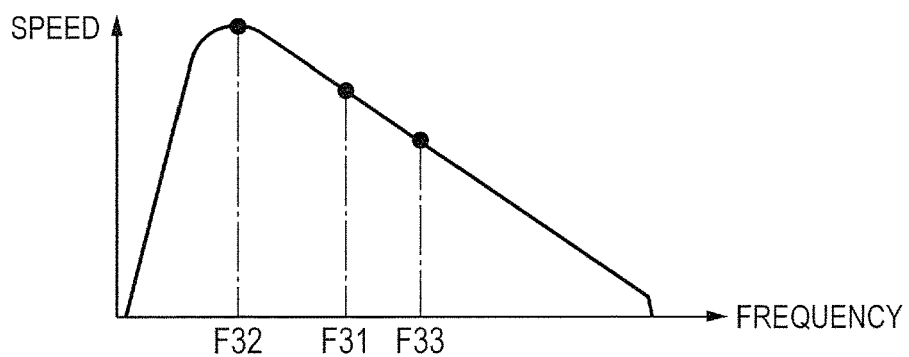
FIG. 3B is a graph for showing a case where the speed characteristics of the vibration motor controller according to the first embodiment change toward a low frequency side (3-point measurement).
Figure 3C:
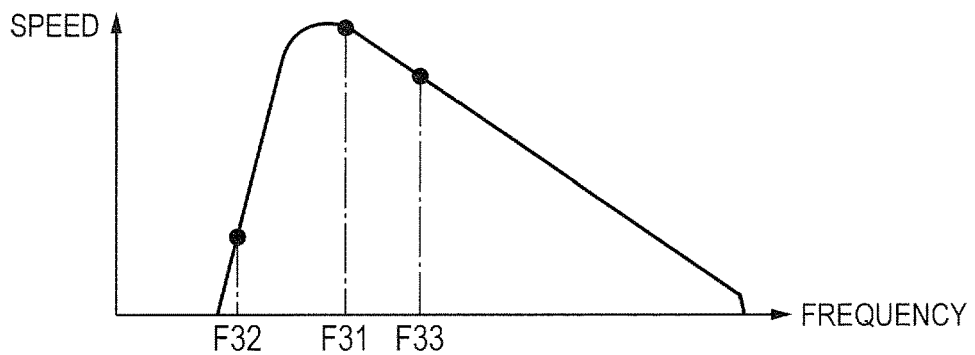
FIG. 3C is a graph for showing a case where the speed characteristics of the vibration motor controller according to the first embodiment change toward a high frequency side (3-point measurement).
Figure 3D:
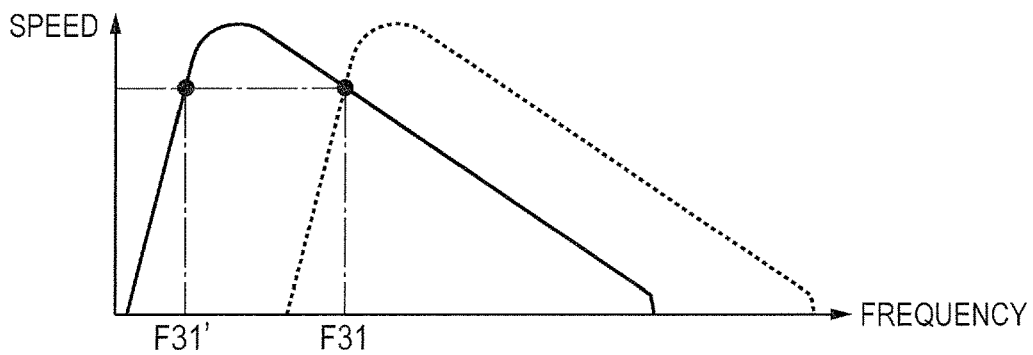
FIG. 3D is a graph for showing a case where the speed characteristics of the vibration motor controller according to the first embodiment change toward the low frequency side (1-point measurement).

The speed characteristics exhibited as a result of conducting the driving at the frequencies of respective three points under two kinds of environments different from each other are shown in FIGS. 3B and 3C. In the case of FIG. 3B, the driving is conducted with the fastest speed at the frequency F32, conducted with the second fastest speed at the frequency F31, and conducted with the third fastest speed at the frequency F33. In comparison between the speeds actually measured at the frequencies F31, F32, and F33 and the speed characteristics, it is understood that the speed characteristics exhibited under the environment of FIG. 3B have changed so that the entire curve of the speed characteristics moves toward the lower frequency side relative to the speed characteristics shown in FIG. 3A as a reference. Next, in the case of FIG. 3C, the driving is conducted with the fastest speed at the frequency F31, conducted with the second fastest speed at the frequency F33, and conducted with the third fastest speed at the frequency F32. Therefore, it is understood that the speed characteristics exhibited under the environment FIG. 3C have changed so that the entire curve moves toward the higher frequency side relative to the speed characteristics shown in FIG. 3A as the reference. The change amount of the speed characteristics is calculated for one point among the frequencies F31, F32, and F33 in the same manner as in FIG. 2C, or an average value is calculated. In this case, attention is focused on the fact that the same speed is sometimes obtained on the lower frequency side and the higher frequency side than the resonant frequency F30 as in a case where the same speed is obtained at the frequency F31 and the frequency F32 in FIG. 3A. In FIG. 3D, a case where the speed is calculated for one point, namely, the frequency F31 under the same environment as in FIG. 3B is shown. In FIG. 3D, the same speed is obtained both at the frequency F31 on the higher frequency side than the resonant frequency and at a frequency F31' on the lower frequency side. That is, it cannot be determined whether the driving speed obtained at a given frequency is the speed obtained on the lower frequency side than the resonant frequency in the curve of the speed characteristics under the environment or the speed obtained on the higher frequency side. Therefore, as in FIG. 3B, the driving speed is calculated at a plurality of frequencies, and relationships between driving speeds are compared with each other, to thereby be able to determine whether a change have been made to the speed characteristics indicated by the solid line or the broken line as shown in FIG. 3D. That is, by calculating the speed for a plurality of frequencies, it is possible to determine whether the frequency at which the speed is derived is on the higher frequency side or the lower frequency side than the resonant frequency.

Further, the change direction of the resonant frequency can be determined by focusing attention on a change in the relationship between the speeds derived for two frequencies on the higher frequency side and the lower frequency side than the resonant frequency at which the same speed can be obtained based on the speed characteristics stored as the reference. As shown in FIG. 3A, the frequency F31 and the frequency F32 are two frequencies on the higher frequency side and the lower frequency side than the resonant frequency, and are frequencies at which the same speed can be obtained based on the speed characteristics serving as the reference. In FIG. 3B, the speed obtained at the frequency F32 becomes faster than the speed obtained at the frequency F31, while in FIG. 3C, the speed obtained at the frequency F31 becomes faster than the speed obtained at the frequency F32. That is, attention is focused on two frequencies at which the same speed is obtained across the resonant frequency in the stored speed characteristics, and the change direction of the resonant frequency can be determined based on a magnitude relationship between the speeds actually measured for the two frequencies.

In this embodiment, the frequency F31 and the frequency F32 are set as the frequencies at which the same speed is obtained, but the present invention is not limited thereto as long as the frequency F31 and the frequency F32 can be handled as two frequencies on the higher frequency side and the lower frequency side than the resonant frequency at which the same speed can be obtained based on the speed characteristics stored as the reference. For example, the frequency F32 and the frequency F33 are selected with a difference between the speed obtained at the frequency F32 and the speed obtained at the frequency F33 being added to the speed obtained at the frequency F33, to thereby be able to be handled as the same speed in terms of calculation.

In this embodiment, the speed characteristics are set as characteristics indicating the speed with respect to the frequency and the phase difference, but effects of the present invention can be produced by setting the speed characteristics as characteristics indicating an acceleration with respect to the frequency and the phase difference. For example, when the vibration motor 101 exhibits different accelerations with respect to respective frequencies and respective phase differences, the speed characteristic memory 107 stores characteristics indicating the acceleration with respect to the frequency and the phase difference. Further, when the vibration motor 101 exhibits the same acceleration with respect to the respective frequencies and respective phase differences, the speed characteristic memory 107 stores characteristics indicating an acceleration time period with respect to the frequency and the phase difference.

Further, in this embodiment, only the activation frequency is corrected, but the same effects can be produced by further providing a resonant frequency memory (memory) configured to store the resonant frequency in addition to the activation frequency and correcting the resonant frequency as well. In general, a frequency lower than the resonant frequency is not used, and hence the frequency lower than the resonant frequency can be prevented from being used by storing the resonant frequency. That is, the resonant frequency is set as a limiting value on the low frequency side. Further, for the correction method, the same amount and the same direction as those of the activation frequency are used.

Those apply to the following embodiments.

Second Embodiment

A vibration motor controller according to a second embodiment of the present invention is described.

The description of the first embodiment is directed to the correction method for the activation frequency based on the speed actually measured when the driving is conducted while the frequency is changed with the phase difference of the frequency signal to be applied to a piezoelectric element being fixed (hereinafter referred to as "frequency control"). A description of this embodiment is directed to the correction method for the activation frequency based on the speed actually measured when the driving is conducted while the phase difference is changed with the frequency of the frequency signal to be applied to a piezoelectric element being fixed (hereinafter referred to as "phase difference control").

Figure 4A:
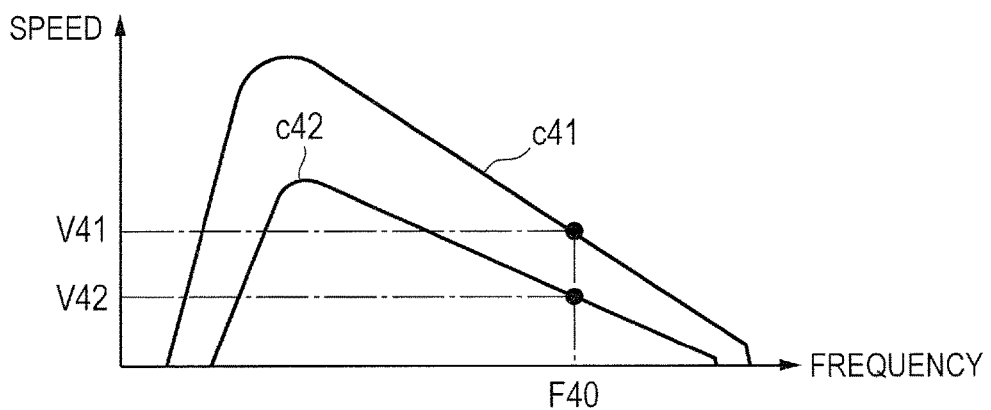
FIG. 4A is a graph for showing reference speed characteristics of a vibration motor controller according to a second embodiment of the present invention.
Figure 4B:
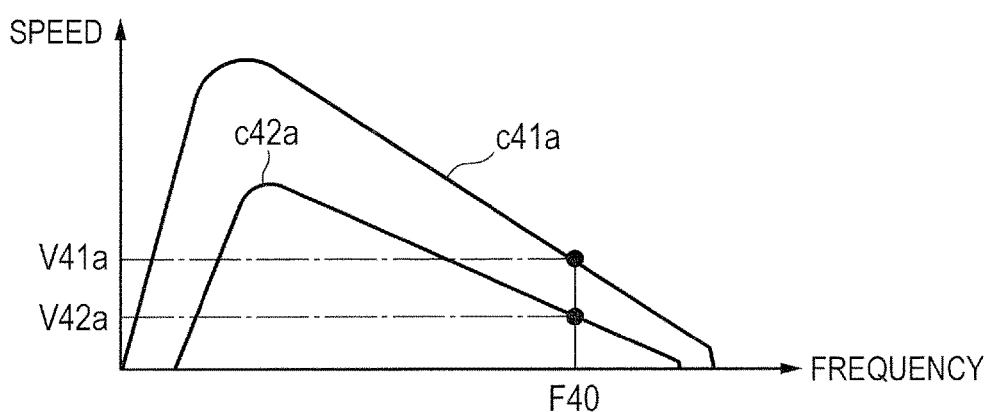
FIG. 4B is a graph for showing a case where the speed characteristics of the vibration motor controller according to the second embodiment change toward the low frequency side.
Figure 4C:
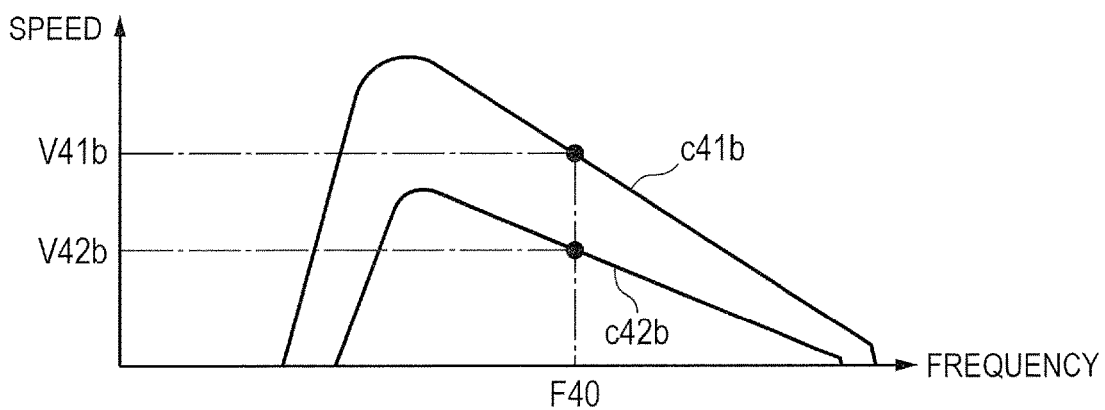
FIG. 4C is a graph for showing a case where the speed characteristics of the vibration motor controller according to the second embodiment change toward the high frequency side.

In this embodiment, the speed characteristics stored in the speed characteristic memory 107 are shown in FIG. 4A. The horizontal axis indicates the frequency, the vertical axis indicates the speed, and curves c41 and c42 each indicate speed characteristics with respect to a different phase difference (characteristics of the speed with respect to the frequency). At a frequency F40 being the activation frequency, a speed V41 is obtained in speed characteristics c41, and a speed V42 is obtained in speed characteristics c42. In this embodiment, attention is focused on speeds obtained when the driving is conducted with two phase differences. Note that, when the driving is conducted with one phase difference, the change direction and the change amount of the speed characteristics are calculated in the same manner as in the first embodiment, and hence this embodiment is described by taking a case where the driving is conducted with two phase differences under conditions in which the frequency is fixed at the activation frequency. In FIGS. 4B and 4C, there are respectively shown the speeds obtained when the driving is conducted with two phase differences under two kinds of environments different from the environmental conditions presupposed by the speed characteristics stored in the speed characteristic memory 107. In the case of FIG. 4B, a speed V41a is obtained based on a curve c41a different from the curve c41 due to the environmental change, and a speed V42a is obtained based on a curve c42a different from the curve c42 due to the environmental change. Then, a difference in speed between the speed V41 and the speed V42 is compared with a difference in speed between the speed V41a and the speed V42a. In the case of FIG. 4B, the difference in speed is smaller than in the case of FIG. 4A. In other words, a change in speed with respect to a change in phase difference is smaller. As understood from FIGS. 4A, 4B, and 4C, on the higher frequency side than the resonant frequency (frequency indicating a maximum speed), the change amount of the speed with respect to the change in the phase difference tends to decrease as the frequency becomes higher, that is, as the speed becomes lower. Therefore, in the case of FIG. 4B, it can be determined that the curves c41 and c42 indicating the speed characteristics serving as the reference have moved toward the low frequency side. Further, in the case of FIG. 4C, a difference between a speed V41$b$ and a speed V42$b$ becomes larger than in the case of FIG. 4A. Therefore, in the case of FIG. 4C, it can be determined that the curves c41 and c42 indicating the speed characteristics serving as the reference have moved toward the high frequency side. In addition, the lower frequency side than the resonant frequency has a much larger speed difference with respect to a phase difference change at the same frequency in the curve c41 and the curve c42 than the higher frequency side than the resonant frequency. That is, when the speed difference becomes larger than a predetermined value, it can be determined that the frequency at which the speed difference has been obtained is on the lower frequency side than the resonant frequency in the speed characteristics under the environment. Further, the change amount can be derived in the same manner as in the first embodiment.

With the method described above, the same controllability can be obtained even before and after the environmental change by detecting the change direction and the change amount of the speed characteristics at a time of the phase difference control as well as at a time of the frequency control as described in the first embodiment and correcting the activation frequency.

In this embodiment, the correction of the activation frequency conducted at the time of the phase difference control is described, and in the first embodiment, the correction of the activation frequency conducted at the time of the frequency control is described. However, the effects of the present invention can be produced by conducting both the phase difference control and the frequency control. For example, in such control that the phase difference control is conducted when the vibration motor is driven at a low speed and the frequency control is conducted when the vibration motor is driven at a high speed, more preferred effects can be produced by employing the correction method of the second embodiment when the phase difference control is conducted and by employing the correction method of the first embodiment when the frequency control is conducted.

Third Embodiment

A vibration motor controller according to a third embodiment of the present invention is described.

A description of the third embodiment is directed to the detection of the change direction and the change amount of the speed characteristics at the time of the phase difference control in the same manner as in the second embodiment, and a correction method therefor. A control method of this embodiment is most characteristically different from that of the second embodiment in that attention is focused on a feature of the speed characteristics exhibited at a time of small phase difference control.

Figure 5A:
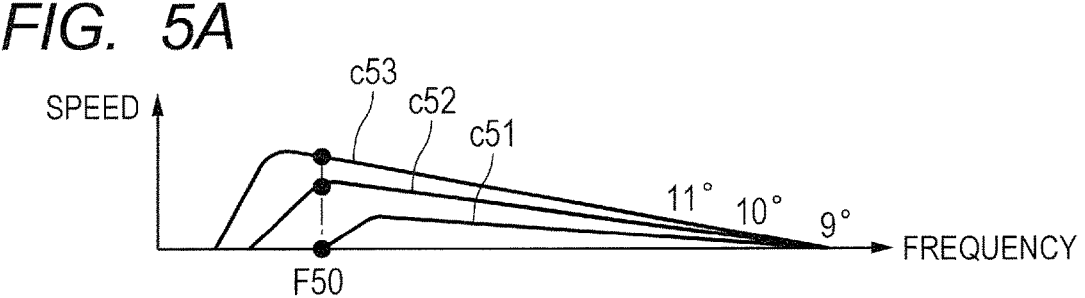
FIG. 5A is a graph for showing reference speed characteristics of the vibration motor controller according to a third embodiment of the present invention.
Figure 5B:
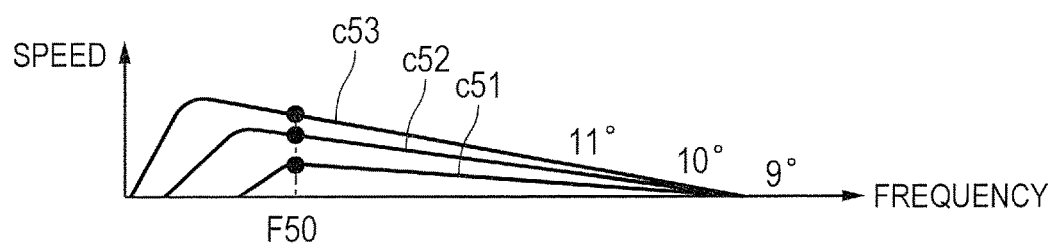
FIG. 5B is a graph for showing a case where the speed characteristics of the vibration motor controller according to the third embodiment change toward the low frequency side.
Figure 5C:
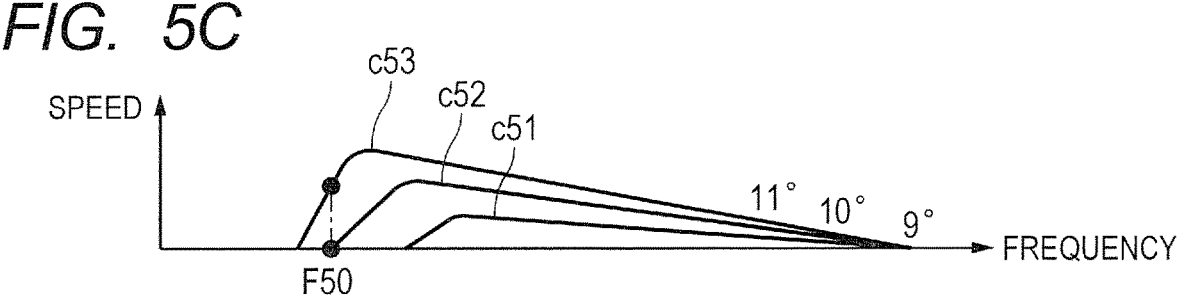
FIG. 5C is a graph for showing a case where the speed characteristics of the vibration motor controller according to the third embodiment change toward the high frequency side.

In this embodiment, the speed characteristics stored in the speed characteristic memory 107 are shown in FIG. 5A. The horizontal axis indicates the frequency, the vertical axis indicates the speed, and a curve c51, a curve c52, and a curve c53 indicate speed characteristics (characteristics of the speed with respect to the frequency) exhibited with a phase difference of 9°, a phase difference of 10°, and a phase difference of 11°, respectively. The frequency is fixed at a frequency F50 serving as the activation frequency, and attention is focused on speed characteristics exhibited when the driving is conducted with the three phase differences. Note that, the change direction and the change amount of the speed characteristics are calculated in the same manner as in the first embodiment when the driving is conducted with one phase difference, and in the same manner as in the second embodiment when the driving is conducted with two phase differences, and hence this embodiment is described by taking a case where the driving is conducted with three phase differences. In FIG. 5A, at the frequency F50, the speed is 0 with the phase difference of 9°, while the speed is not 0 with the phase differences of 10° and 11°. That is, the vibration motor 101 is not driven with the phase difference of 9°. In FIGS. 5B and 5C, there are respectively shown the speed characteristics exhibited as a result of conducting the driving with the phase differences of 9°, 10°, and 11° under two kinds of environments different from the environmental conditions presupposed by the speed characteristics stored in the speed characteristic memory 107. Under the environment of FIG. 5B, the speed is not 0 with all the phase differences of 9°, 10°, and 11°. That is, with the phase difference of 9°, the speed is 0 in FIG. 5A, while the speed is not 0 under the environment shown in FIG. 5B. This is because, as can be understood from FIG. 5B, the speed characteristics have changed toward the low frequency side. In other words, from the phase difference of 9° with which the speed is 0 in FIG. 5A and is not 0 under the environment shown in FIG. 5B, it can be determined that the speed characteristics have changed toward the low frequency side. Further, under the environment shown in FIG. 5C, the speed is 0 with the phase differences of 9° and 10°. That is, also with the phase difference of 10° with which the speed is not 0 in FIG. 5A, the speed is 0 under the environment shown in FIG. 5C. This is because, as can be understood from FIG. 5C, the speed characteristics have changed toward the high frequency side. In other words, from the phase difference of 10° with which the speed is not 0 in FIG. 5A and is 0 under the environment shown in FIG. 5C, it can be determined that the speed characteristics have moved toward the high frequency side. The change amount is calculated for the phase difference with which the driving can be conducted under both the environments shown in FIGS. 5B and 5C in the same manner as in the first embodiment. For example, attention is focused on the phase difference of 11° in the case of FIG. 5B.

With the method described above, particularly at the time of the small phase difference control, the change direction of the speed characteristics can be detected by focusing attention on a change in boundary between the phase difference with which the driving can be conducted (the speed is not 0) and the phase difference with which the driving cannot be conducted (the speed is 0).

Fourth Embodiment

A control method for a vibration motor according to a fourth embodiment of the present invention is described.

A description of this embodiment is directed to a case where a vibration motor is employed for an actuator for a lens apparatus. An environment under which the lens apparatus is operated is not always a stable environment as well. That is, even when the vibration motor is employed for the actuator configured to drive a lens, the change in the speed characteristics due to the environmental change needs to be handled. The description of this embodiment is directed to an operation for applying the correction method for the activation frequency described in each of the first embodiment, the second embodiment, and the third embodiment while the lens apparatus is in a normal operation.

Figure 6:
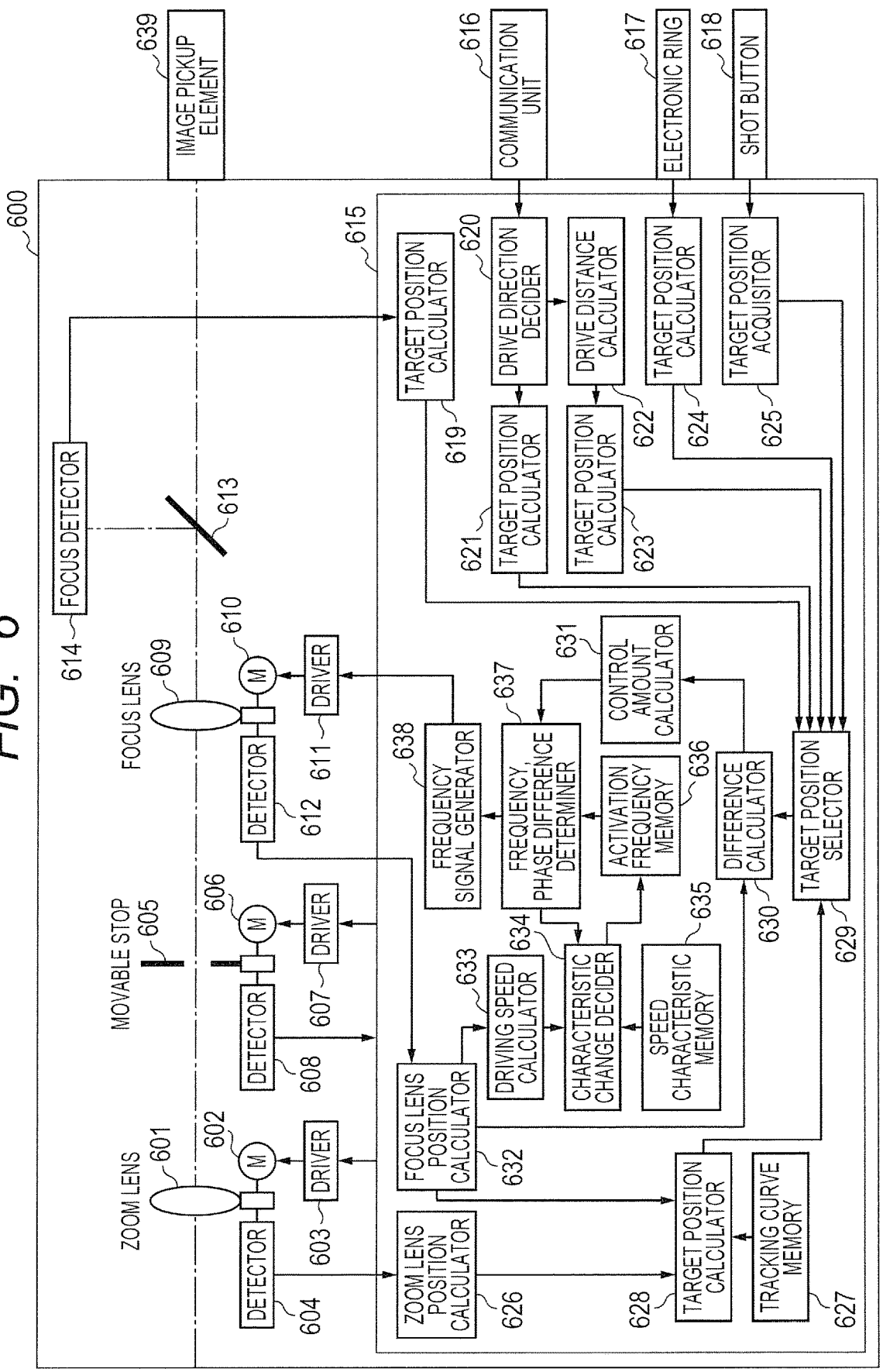
FIG. 6 is a block diagram of a lens apparatus according to a fourth embodiment of the present invention.

A configuration of a lens apparatus according to this embodiment is described with reference to FIG. 6. In the following description, to facilitate an understanding of the present invention, only main components of the present invention are described with reference to FIG. 6, and components that are not involved in features of the present invention are omitted. Further, descriptions of parts irrelevant to the gist of the present invention and known technologies are omitted.

A lens apparatus 600 includes a focus lens (movable optical member) 609, and this focus lens 609 moves along an optical axis direction to change a position of an imaging plane of the lens apparatus 600.

A zoom lens (movable optical member) 601 moves along the optical axis direction to change a focus distance of the lens apparatus 600. The zoom lens 601 is connected to a zoom motor 602. The zoom motor 602 is driven by a zoom driver 603 to move the zoom lens 601 along the optical axis direction. The zoom motor 602 and the zoom driver 603 form a zoom driving unit. A position of the zoom lens 601 is detected by a zoom lens position detector 604.

A movable stop (movable optical member) 605 is connected to an iris motor 606. The iris motor 606 is driven by an iris driver 607 to drive the movable stop 605. The iris motor 606 and the iris driver 607 form an iris driving unit. A position (aperture) of the movable stop 605 is detected by an iris position detector 608.

The focus lens (movable optical member) 609 is connected to a focus motor 610. In this embodiment, a vibration motor is used as the focus motor 610. The focus motor 610 is driven by a focus driver 611 to move the focus lens 609 along the optical axis direction. The focus motor 610 and the focus driver 611 form a focus lens driving unit. The position of the focus lens 609 is detected by a focus lens position detector 612.

A spectral prism 613 separates light transmitted through the focus lens 609 and the zoom lens 601 into two light fluxes. One of the light fluxes transmitted through the spectral prism 613 passes through a relay lens (not shown) to enter an image pickup element 639. Further, the other light flux reflected by the spectral prism 613 enters a phase difference focus detector 614. The focus detector 614 is formed of a phase difference detecting lens and a phase difference detecting sensor, and uses the phase difference sensor to photoelectrically convert a pair of images (two images) formed of the two light fluxes separated by the phase difference detecting lens. A target position due to phase difference AF is calculated by a phase difference AF target position calculator 619 based on a pair of image signals.

A lens controller 615 is, for example, a microcomputer, and controls the focus lens driving unit, the zoom lens driving unit, and the iris driving unit.

A communication unit 616 conducts communications to/from a camera (not shown), and communicates information on video AF. When an instruction to start the video AF is received from the camera, a drive direction decider 620 determines a drive direction for conducting the video AF, that is, a peak direction of a contrast value. When the drive direction cannot be determined, a target position calculator 621 calculates the target position for determining the drive direction. On the other hand, when the drive direction is determined, a drive distance calculator 622 calculates a drive distance in order to find a peak of the contrast value. With a calculation method for the drive distance, when the contrast value is small, the drive distance is calculated as a relatively long distance because the peak is in a long distance. A peak search target position calculator 623 calculates the target position based on the drive distance calculated by the drive distance calculator 622.

An electronic ring 617 outputs a two-phase digital pulse that changes in potential based on an operation, and is used for calculating the target position of the focus lens 609. An electronic ring target position calculator 624 converts the output two-phase digital pulse into an amount in a positional dimension to calculate the target position.

A shot button 618 is, for example, a button or a switch, and outputs a trigger for driving the focus lens 609 to the target position stored in a target position acquisitor 625.

A zoom lens position calculator 626 converts information detected by the zoom lens position detector 604 into positional information through the arithmetic operation. A tracking target position calculator 628 calculates a tracking target position based on the position of the zoom lens 601, a tracking curve stored in a tracking curve memory 627, and the position of the focus lens 609. The lens apparatus 600 conducts a tracking operation so as to follow the driving of the zoom lens 601 because the focus lens 609 is located on an image pickup element side of the zoom lens 601.

A target position selector 629 selects one target position from among various target positions of the focus lens 609 described above. When there is one target position that has been updated, the updated target position is employed. On the other hand, when there is a plurality of target positions that has been updated, a target position having a high priority is employed. For example, when the target position calculated based on the operation of the electronic ring 617 and the tracking target position are simultaneously updated, the target position calculated based on the operation of the electronic ring 617 is employed.

A difference calculator 630 calculates a difference between the target position selected by the target position selector 629 and the position of the focus lens 609.

A control amount calculator 631 is implemented by, for example, PID control, and calculates a control amount from the difference.

A focus lens position calculator 632 converts information detected by the focus lens position detector 612 into positional information through the arithmetic operation.

A driving speed calculator 633 calculates the driving speed based on positional information on the focus lens 609. For a calculation method therefor, for example, a difference between a current position and a previous position at least one time before may be used.

A characteristic change decider 634 determines a change in the speed characteristics from the driving speed calculated as a result of driving the focus motor (vibration motor) 610 based on the frequency signal formed of the phase difference and the frequency determined by a frequency/phase-difference determiner 637 described later and the speed characteristics stored in the speed characteristic memory 635. The activation frequency stored in an activation frequency memory 636 is corrected based on the determination result. The detailed correction method is described in each of the first embodiment, the second embodiment, and the third embodiment.

The frequency/phase-difference determiner 637 determines the phase difference and the frequency of the frequency signal to be applied to the vibration motor 610 from the control amount calculated by the control amount calculator 631 and the activation frequency.

A frequency signal generator 638 generates the frequency signal to be applied to the vibration motor 610.

In regard to the configuration described above, the correction method for each target position is described. In FIGS. 7A, 7B, 8, 9A, and 9B, the target position of the focus lens 609 and a drive locus of the focus lens 609 are shown.

Figure 7A:
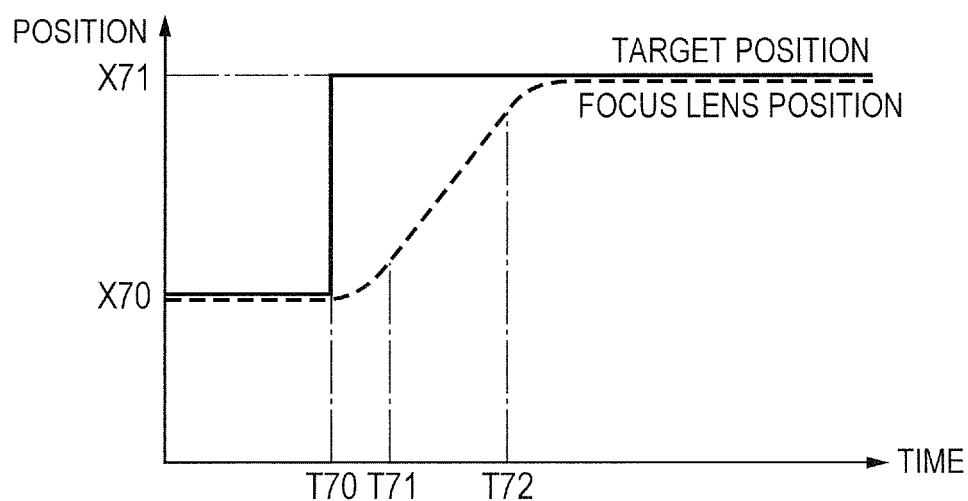
FIG. 7A is a graph for showing a STEP input target position (in a case of 1-point measurement).
Figure 7B:
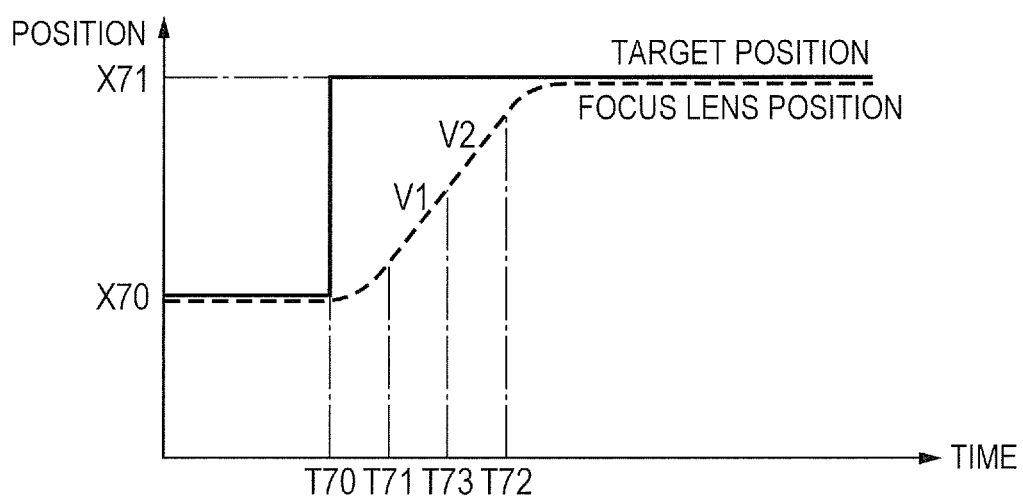
FIG. 7B is a graph for showing a STEP input target position (in a case of 2-point measurement).

In FIGS. 7A and 7B, a case where a target position of the focus lens 609 greatly deviating from a current position is calculated with one input (STEP input) is shown. The horizontal axis indicates the time, the vertical axis indicates the position, the solid line indicates the target position, and the broken line indicates the position of the focus lens 609. In the lens apparatus 600, such a target position as shown in FIG. 7A may be input when the target position is calculated in cases such as an operation of a shot button, an operation of the phase difference AF in a large defocused state, or an operation of the video AF in a state exhibiting a low contrast value. Further, the target position shown in FIG. 7A may be calculated also in an origin resetting operation conducted when a relative encoder is used to detect the position. Next, the correction method for the activation frequency shown in FIG. 7A is described. The target position is updated from X70 to X71 at a time T70. The control amount is calculated based on the difference between the updated target position and the position of the focus lens 609. Subsequently, the focus lens 609 starts driving toward the target position. A period from the time T70 until a time T71 is an acceleration time period, a constant speed is maintained during a period from the time T71 until a time T72, and a period after the time T72 is a deceleration time period. That is, the constant speed (substantially open control) is maintained during the period from the time T71 until the time T72, and hence information sufficient for calculating the driving speed can be obtained. Therefore, the driving speed calculated during the period from the time T71 until the time T72 is used to use the correction method of each of the first, second, and third embodiments. That is, during a normal operation of the lens apparatus 600, the change in the speed characteristics can be detected, and the activation frequency can be corrected. As another method, in FIG. 7B, a case where the driving is conducted with two speeds (two frequencies or two phase differences) until the target position is reached is shown. In the same manner as in FIG. 7A and in 7B, after the acceleration time period is passed, the driving is conducted with a frequency and a phase difference with which a speed V1 is obtained during a period from the time T71 until a time T73, and the driving is conducted with a frequency and a phase difference with which a speed V2 is obtained during a period from the time T73 until the time T72. Therefore, the driving is conducted with the two speeds (frequencies or phase differences) until one target position is reached, to thereby be able to detect the change direction and the change amount through use of two points in the speed characteristics, and to correct the activation frequency. With the method described above, the speed of the vibration motor is measured in a default operation during the normal operation, to thereby be able to detect the change direction and the change amount of the speed characteristics, and to correct the activation frequency through determination of the change in the speed characteristics. Therefore, by detecting the change in the speed characteristics during the normal operation of the lens apparatus 600, and by correcting the activation frequency, the same controllability can be obtained even before and after the change in the speed characteristics.

Figure 8:
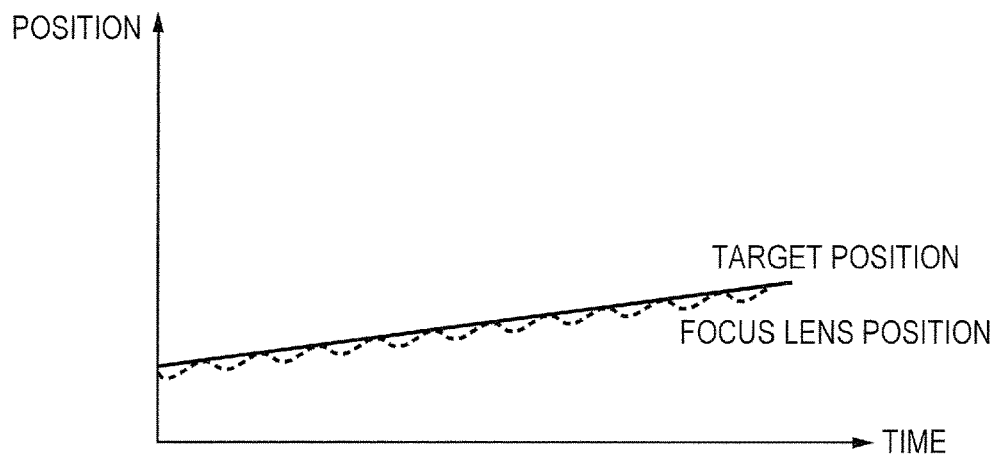
FIG. 8 is a graph for showing a low-speed driving target position.

Next, in FIG. 8, a case where the target position at a time of low-speed driving is calculated is shown. The horizontal axis indicates the time, the vertical axis indicates the position, the solid line indicates the target position, and the broken line indicates the position of the focus lens 609. In the lens apparatus 600, such a target position as shown in FIG. 8 may be input when the target position is calculated by the electronic ring 617 at a time of focusing or by the video AF from a state exhibiting a high contrast value. In the case of the low-speed driving shown in FIG. 8, a distance to the target position is short, and thus the focus lens 609 is driven with such a phase difference and a frequency as to attain the low-speed driving. The controller conducts fine control due to the low-speed driving. That is, it is predicted that the phase difference and the frequency are often changed. Therefore, points of measurement in the speed characteristics increase in number. In addition, the boundary between the phase difference with which the speed is 0 and the phase difference with which the speed is not 0, which is described in the third embodiment, becomes easy to find. Further, at the time of the low-speed driving, a time period required for the acceleration is shorter than at a time of a high-speed driving, and hence the information sufficient for calculating the speed can be obtained even in the fine control in which the phase difference and the frequency are often changed. With the method described above, even at the time of the low-speed driving, the change in the speed characteristics can be determined, and the activation frequency can be corrected. Therefore, by detecting the change in the speed characteristics during the normal operation of the lens apparatus 600, and by correcting the activation frequency, the same controllability can be obtained even before and after the change in the speed characteristics.

Figure 9A:
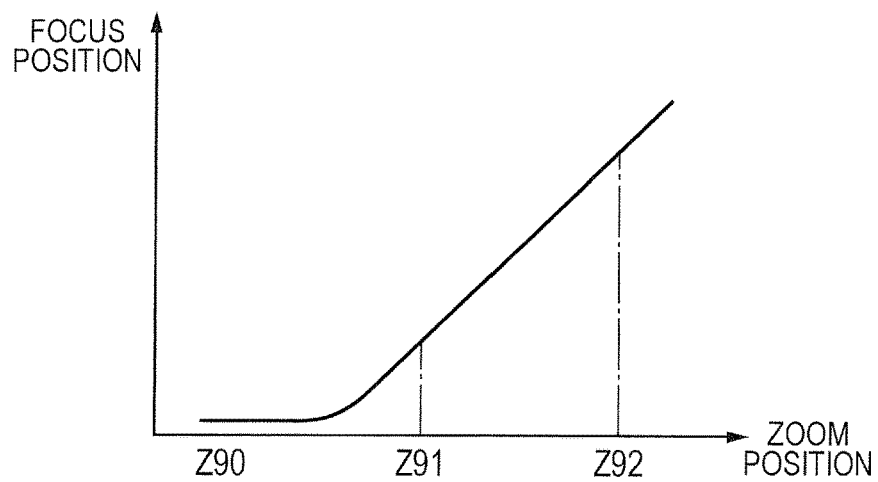
FIG. 9A is a graph for showing a tracking operation target position (in a case of a straight line type).
Figure 9B:
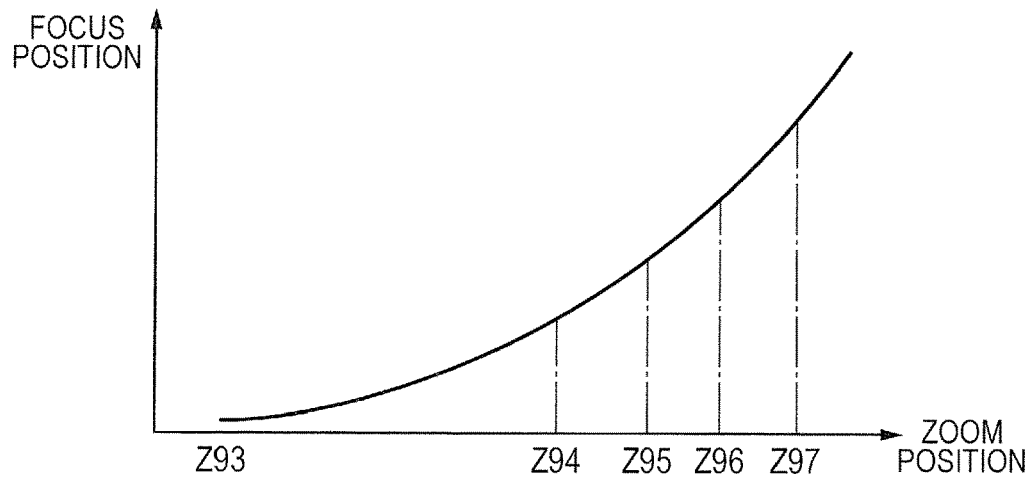
FIG. 9B is a graph for showing the tracking operation target position (in a case of a curve type).

Next, in FIG. 9A, a case where the target position at a time of the tracking operation is calculated is shown. The horizontal axis indicates a zoom lens position, the vertical axis indicates a focus lens position, and the solid line indicates the focus lens position relative to the zoom lens position in a given subject distance. A zoom lens position Z90 indicates a wide-angle end, and a zoom lens position Z92 indicates a telephoto end. As understood from FIG. 9A, as the zoom lens position becomes closer to the telephoto end, the focus lens position changes relative to a change in the zoom lens position more greatly on the telephoto end than on the wide-angle end. Further, the driving speed of the focus lens 609 changes in association with the driving speed of the zoom lens 601. In the case of FIG. 9A, it is understood that an inclination is constant between a zoom lens position Z91 and the zoom lens position Z92. Therefore, the driving speed of the focus lens 609 is highly likely to become constant between the zoom lens position Z91 and the zoom lens position Z92, and hence the information sufficient for calculating the driving speed of the focus lens 609 can be obtained. That is, when the target position can be predicted in advance as in the tracking operation, the driving speed of the vibration motor can be calculated during an interval during which the speed is constant. Next, in FIG. 9B, the target position at the time of the tracking operation is shown in the same manner as in FIG. 9A. In the case of FIG. 9B, a curve such as a quadratic function is drawn, and there is no interval during which the inclination is constant unlike in FIG. 9A. In this case, an interval between a zoom lens position Z94 and a zoom lens position Z95 is subjected to linear approximation to create an interval during which the inclination is constant. Therefore, the information sufficient for calculating the driving speed of the focus lens can be obtained. In addition, an interval between a zoom lens position Z96 and a zoom lens position Z97 is also subjected to the linear approximation, to thereby be able to calculate the driving speed of the focus lens with two speeds. With the method described above, even at the time of the tracking operation, the change in the speed characteristics can be determined, and the activation frequency can be corrected. Therefore, by detecting the change in the speed characteristics during the normal operation of the lens apparatus 600, and by correcting the activation frequency, the same controllability can be obtained even before and after the change in the speed characteristics.

According to the method described above for each type of the target position, the lens apparatus 600 can obtain the same controllability even before and after the change in the speed characteristics by detecting the change in the speed characteristics of the focus motor 610 being the vibration motor during the normal operation, and by correcting the activation frequency. In addition, the configuration can be realized without adding a new component such as a temperature sensor or providing a dedicated operation such as a detection operation different from the normal operation.

The target position described in this embodiment is merely an example, and the present invention is not limited thereto as long as the driving speed can be calculated. For example, in a case of calculating the target position for which the driving is conducted at a constant speed for a fixed time period based on the operation of the electronic ring 617, the driving speed can be calculated during the interval during which the speed is constant.

In this embodiment, the calculation method for a plurality of driving speeds with respect to one input is described, but a plurality of kinds of target positions may be combined to calculate a plurality of driving speeds. For example, a driving speed memory (memory) is added to the lens apparatus 600, and the driving speed is calculated for the target position shown in FIG. 7A to be stored into the driving speed memory. Subsequently, the driving speed is calculated for the target position shown in FIG. 9A. Subsequently, two driving speeds of the driving speed calculated for the target position shown in FIG. 7A and the driving speed calculated for the target position shown in FIG. 9A are used to determine the change direction and the change amount of the speed characteristics. Further, when the driving speed is stored in the driving speed memory, the phase difference and the frequency of the frequency signal applied to the vibration motor (focus motor 610) are stored together. Note that, when the lens apparatus 600 is powered off or when a predetermined time period has elapsed, there may be another change in the environment, and hence it is preferred to delete the information stored in the driving speed memory.

Further, an image pickup apparatus that can produce the effects of the present invention can be realized by forming an image pickup apparatus including: the lens apparatus including the vibration motor controller described in the above-mentioned embodiments; and an image pickup element.

The exemplary embodiments of the present invention are described above, but the present invention is not limited to these embodiments and can be modified and changed variously within the scope of the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-025011, filed Feb. 12, 2015, which is hereby incorporated by reference herein in its entirety.

What is claimed is:

1. A vibration motor control apparatus configured to control a vibration motor, the vibration motor being configured to cause a vibrating member in which a vibration is excited based on two frequency signals having a phase difference therebetween to generate relative movement between the vibrating member and a contact member brought into contact with the vibrating member, the vibration motor control apparatus comprising:

a detector configured to detect a speed of the relative movement; and a controller configured to:

conduct control of the speed by changing at least one of a frequency of the two frequency signals and the phase difference;

store a speed characteristic, of the vibration motor, which is a relationship between the speed and the frequency and used for the control of the speed, and a set frequency from which the frequency of the two frequency signals is decreased in a control in which the speed is increased, the set frequency corresponding to a first environmental condition;

acquire a change amount and a change direction in a frequency corresponding to a speed in the stored speed characteristic based on a comparison between a frequency, in the stored speed characteristic, at the speed detected by the detector under the control of the speed and an actual frequency at which the detected speed is obtained; and correct the stored set frequency based on the change amount and the change direction such that the corrected stored set frequency corresponds to a second environmental condition different from the first environmental condition.

2. The vibration motor control apparatus according to claim 1, wherein the actual frequency includes a frequency which is higher than a frequency, corresponding to a maximum speed, in the speed characteristic.

3. The vibration motor control apparatus according to claim 1, wherein the actual frequency includes a frequency which is lower than a frequency, corresponding to a maximum speed, in the speed characteristic.

4. The vibration motor control apparatus according to claim 1, wherein the actual frequency includes a first frequency and a second frequency, the first frequency being higher than a frequency, corresponding to a maximum speed, in the speed characteristic, the second frequency being lower than the frequency, corresponding to the maximum speed, in the speed characteristic.

5. The vibration motor control apparatus according to claim 2, wherein the controller is configured to cause the set frequency to be higher in a case where the detected speed is higher than a speed indicated in the speed characteristic with respect to the same frequency.

6. The vibration motor control apparatus according to claim 3, wherein the controller is configured to cause the set frequency to be lower in a case where the detected speed is higher than a speed indicated in the speed characteristic with respect to the same frequency.

7. The vibration motor control apparatus according to claim 4, wherein:
the first frequency and the second frequency, lower than the first frequency, are selected such that they correspond to respective speeds, equal to each other, in the stored speed characteristic; and
the controller is configured to cause the set frequency to be higher in a case where the speed detected at the first frequency is faster than the speed detected at the second frequency.

8. The vibration motor control apparatus according to claim 1, wherein:
the controller is configured to store the speed characteristic with respect to the phase difference and the frequency; and
the controller is configured to cause the set frequency to be higher in a case where the detected speed is higher than a speed indicated in the stored speed characteristic with respect to the same phase difference and the same frequency higher than a frequency corresponding to a maximum speed in the stored speed characteristic.

9. The vibration motor control apparatus according to claim 1, wherein:
the controller is configured to store the speed characteristic with respect to the phase difference and the frequency; and
the controller is configured to cause the set frequency to be higher in a case where a difference between detected speeds is larger than a difference between speeds indicated in the stored speed characteristic with respect to the same two phase differences and the same frequency higher than a frequency, corresponding to a maximum speed, in the stored speed characteristic.

10. The vibration motor control apparatus according to claim 1, wherein the controller is configured to change the stored speed characteristic based on the change amount and the change direction.

11. The vibration motor control apparatus according to claim 1, wherein the stored set frequency is the highest frequency among frequencies to be used for the control of the speed.

12. The vibration motor control apparatus according to claim 1, wherein the controller is configured to change the stored set frequency by the change amount in the change direction.

13. A lens apparatus, comprising:
a movable optical member; and
a vibration motor configured to move the movable optical member, the vibration motor being configured to cause a vibrating member in which a vibration is excited based on two frequency signals having a phase difference therebetween to generate relative movement between the vibrating member and a contact member brought into contact with the vibrating member; and
a vibration motor control apparatus configured to control the vibration motor,
wherein the vibration motor control apparatus comprises:
a detector configured to detect a speed of the relative movement; and
a controller configured to:
conduct control of the speed by changing at least one of a frequency of the two frequency signals and the phase difference;
store a speed characteristic, of the vibration motor, which is a relationship between the speed and the frequency and used for the control of the speed, and a set frequency from which the frequency of the two frequency signals is decreased in a control in which the speed is increased, the set frequency corresponding to a first environmental condition;
acquire a change amount and a change direction in a frequency corresponding to a speed in the stored speed characteristic based on a comparison between a frequency, in the stored speed characteristic, at the speed detected by the detector under the control of the speed and an actual frequency at which the detected speed is obtained; and
correct the stored set frequency based on the change amount and the change direction such that the corrected stored set frequency corresponds to a second environmental condition different from the first environmental condition.

14. An image pickup apparatus, comprising:
a lens apparatus; and
an image pickup element configured to receive light incident thereon from the lens apparatus,
wherein the lens apparatus comprises:
a movable optical member; and
a vibration motor configured to move the movable optical member, the vibration motor being configured to cause a vibrating member in which a vibration is excited based on two frequency signals having a phase difference therebetween to generate relative movement between the vibrating member and a contact member brought into contact with the vibrating member; and
a vibration motor control apparatus configured to control the vibration motor,
wherein the vibration motor control apparatus comprises:
a detector configured to detect a speed of the relative movement; and
a controller configured to:
conduct control of the speed by changing at least one of a frequency of the two frequency signals and the phase difference;

store a speed characteristic, of the vibration motor, which is a relationship between the speed and the frequency and used for the control of the speed, and a set frequency from which the frequency of the two frequency signals is decreased in a control in which the speed is increased, the set frequency corresponding to a first environmental condition;

acquire a change amount and a change direction in a frequency corresponding to a speed in the stored speed characteristic based on a comparison between a frequency, in the stored speed characteristic, at the speed detected by the detector under the control of the speed and an actual frequency at which the detected speed is obtained; and correct the stored set frequency based on the change amount and the change direction such that the corrected stored set frequency corresponds to a second environmental condition different from the first environmental condition.

* * * * *